United States Patent [19]

Matthews

[11] Patent Number: 4,535,712
[45] Date of Patent: Aug. 20, 1985

[54] VARIABLE AIR CUSHION MODE VEHICLE

[76] Inventor: Leslie N. Matthews, 110 Fitzgerald St., Geraldton, W.A., Australia, 6530

[21] Appl. No.: 453,888

[22] Filed: Dec. 14, 1982

[30] Foreign Application Priority Data

Apr. 16, 1981 [AU] Australia ............................ PE8497

[51] Int. Cl.³ .............................................. B63B 1/38
[52] U.S. Cl. ................................... 114/61; 114/67 A; 180/127
[58] Field of Search ..................... 114/67 A, 288, 289, 114/56, 61, 271, 283, 284, 285, 287; 180/116–130

[56] References Cited

U.S. PATENT DOCUMENTS

| | | | |
|---|---|---|---|
| 3,216,518 | 11/1965 | Beardsley | 114/67 A |
| 3,414,076 | 12/1968 | Bertin et al. | 180/121 |
| 3,437,067 | 4/1969 | Malin | 114/61 |
| 3,559,222 | 2/1971 | Walker | 114/287 |
| 3,647,018 | 3/1972 | Croix-Marie et al. | 180/121 |
| 3,756,342 | 9/1973 | Burdick | 180/126 |
| 4,135,595 | 1/1979 | Tattersall | 180/117 |
| 4,172,506 | 10/1979 | Terry | 180/125 |
| 4,351,262 | 9/1982 | Matthews | 114/284 |

Primary Examiner—Trygve M. Blix
Assistant Examiner—Stephen P. Avila
Attorney, Agent, or Firm—Holman & Stern

[57] ABSTRACT

A boat hull having at least one extending hull (10), an intermediate hull portion (13), a flexible plenum chamber (14) to raise and lower the intermediate hull portion (13), and a flexible skirt (17) formed integrally with the intermediate hull (13) to entrain air beneath it so that its lower extremities are clear of the ground or water.

11 Claims, 5 Drawing Figures

VARIABLE AIR CUSHION MODE VEHICLE

The invention of this application is disclosed in corresponding International Application No. PCT/AU 82/000 58 filed Apr. 16, 1982, under which priority is claimed.

BACKGROUND OF THE INVENTION

1. Field of the Invention

The present invention relates to a variable geometry boat hull and more particularly to a boat hull which incorporates the air cushion principle.

2. Description of the Prior Art

Air cushion vessels fall into two general categories. Full skirted vessels have a non-rigid, inflatable, skirt which surrounds the vessel and entrains air beneath the hull. Solid side wall vessels on the other hand have solid side wall portions which engage, and project into, the water, while having flexible, inflatable, air entrainment barriers at least at the stern of the vessel and extending between the two solid side walls. In some cases air entrainment means will also be provided at the bow of the vessel and again extending between the solid side walls.

The solid side wall vessels have a number of substantial advantages as compared with the fully skirted vessels. The solid side walls more effectively entrain the air beneath the vessel and therefore less energy is needed to maintain the cushion of air beneath the vessel. Further energy savings are provided by the lower energy requirement in order to maintain the air entrainment means inflated. The solid side wall vessels have also been found to have better seakeeping qualities which makes them advantageous for long journeys in open water.

The full skirted vessels, however, have a significant advantage in that they are able to move on land which is not generally possible with the solid side wall version.

To overcome the problems associated with solid side walls retractable seals which can be called upon when needed have been proposed. Two such seal arrangements are known; one whereby recess is formed in each side wall to accommodate an inflatable extendable seal whilst the other arrangement is to fit a flap type mechanism against the insides of each side wall which can be pivoted up and held or pivoted down to extend below the sides of the hulls.

Both types of air cushion vehicle (fully skirted or solid sidewalled) do not have ability to travel at speed except when supported on an air cushion and in this state both are limited in their sea going capability.

Both types of air cushion vehicle are dependent upon air propulsion for travel out of the water.

BRIEF SUMMARY OF THE INVENTION

The present invention, is in one aspect, directed to the provision of a vessel which can function as a boat and be converted from a solid side wall to a fully skirted vessel to allow the vessel to be used on land while having the superior qualities of the solid side wall vessel at sea. In this aspect the present invention consists in a boat hull comprising at least one longitudinally extending hull, an intermediate hull portion between the lateral extremeties of said at least one hull, means to raise and lower the intermediate hull portion relative to the remainder of the hull, air entrainment means extending between the lateral extremeties of said hull at or adjacent the rear end of the intermediate hull portion, means to introduce air beneath the intermediate hull portion and flexible skirt means formed integrally with the intermediate hull portion which may be utilized when the intermediate hull portion is in a lowered position to entrain air beneath the intermediate hull portion with the lateral extremeties of the hull clear of the ground or water over which the vessel is positioned.

In a particularly preferred form the boat hull is of catamaran configuration with the intermediate hull portion being situated between the two hulls.

In another form a multi-hull vessel is provided wherein each hull is provided with a configuration in accordance with the present invention and not provided under the bridge between adjacent hulls.

Circumstances do exist in which it may be desirable to convert an air cushion vessel into a conventional vessel and in another aspect the present invention consists in a boat hull which may be easily converted from an air cushion vessel to a conventional vessel. In this aspect the present invention consists in a boat hull comprising at least one longitudinally extending hull, an intermediate hull portion between the lateral extremities of said at least one hull, means to raise and lower the intermediate hull portion relative to the remainder of the hull, air entrainment means extending between the lateral extremities of the hull at or adjacent the rear end of the intermediate hull portion and means to introduce air beneath the intermediate hull portion when it is in a raised position such that the hull may then be supported on a cushion of air.

If the means to raise and lower the intermediate hull portion are also arranged to allow movement of the intermediate hull portion fore and aft relative to the lateral extremities of the hull an air cushion vessel of the solid side wall type may be enabled to "walk" on solid ground. In this aspect the present invention consists in a boat hull comprising at least one longitudinally extending hull, an intermediate hull portion between the lateral extremities of the hull, means to raise and lower the intermediate hull portion relative to the remainder of the hull and to move the intermediate hull portion fore and aft relative to the hull, air entrainment means extending between the lateral extremities of the hull at or adjacent the aft end of the intermediate hull portion, and means to introduce air beneath the intermediate hull portion when the intermediate hull portion is raised such that the hull may be supported on a cushion of air.

In any of the above embodiments of the invention it is desirable that the means to raise and lower the intermediate hull portion at least includes a plenum chamber, and preferably a flexible plenum chamber, disposed within the intermediate hull portion. This plenum chamber may be expanded or retracted by pumping air into or out of it thereby raising or lowering the intermediate hull portion. If desired a plurality of plenum chambers may be provided. The plenum chamber provides the additional advantage of excluding water from the intermediate hull portion.

The intermediate hull portion is preferably provided with closable apertures which allow air to be passed from within the plenum chamber to the area beneath the intermediate hull portion. By controlling the opening and closing of such an aperture or apertures a single air supply can be used both to enlarge or contract the plenum chamber and to provide the air stream required to generate the cushion of air beneath the vessel hull.

If desired air may be introduced into the area beneath the intermediate hull portion through a nozzle which is mounted on gimbals or other flexible mounting means allowing the direction of introduction of air into the area to be varied. This arrangement allows the incoming air stream to provide both lift and propulsion.

It is further preferred that flexible skirt portions are provided down either side of the intermediate hull portion. Air is preferably introduced beneath the intermediate hull portion when it is lowered and the skirt portion is to be utilized through a plurality of apertures arranged down either side of the intermediate hull portion. This arrangement blows air into the skirts, which are preferably of a curved configuration bulging outwardly away from the intermediate hull portion. This skirt form directs the incoming air inwardly under the vessel and reduces air loss. When air is directed into the skirts through such rows of laterally placed holes the central aperture will be closed down commensurately with the amount of air flowing through the lateral holes.

Means are preferably provided to draw the skirt portions in against the underside of the intermediate hull portion when they are not extended. In one form these means comprise a plurality of elastic webs connecting the skirt portions to the intermediate hull portion, the webs lying at right angles to the longitudinal direction of the skirt at its point of contact thereto. In other forms the skirts may be drawn into recesses in the intermediate hull portion when not required.

It will be appreciated that it is within the ambit of the present invention for both of the longitudinally extending hull portions to form part of one hull of a multihull vessel, the other hull or hulls of such vessel being each similarly formed with its own longitudinally extending hull portions and intermediate hull portions. The dimension of the bridge and the intermediate hull portion are widely variable such that the vessels according to this invention may vary greatly in external appearance.

In general it will be necessary to have air entrainment means extending between the lateral hull portion adjacent the bow of the vessel in addition to those at the rear of the intermediate hull portions. The presence of these additional air entrainment means are avoided if air is blown under the intermediate hull portion by blowers mounted at or adjacent the bow of the vessel.

BRIEF DESCRIPTION OF THE DRAWINGS

Hereinafter given by way of example only is a preferred embodiment of the present invention described with reference to the accompanying drawings wherein.

DETAILED DESCRIPTION

The boat hull depicted in the accompanying Figures includes the first and second aspects of the invention as hereinbefore defined where there are two spaced apart hulls with the air cushion lifting system disposed therebetween.

The boat hull 10 comprises a pair of lateral hull portions 11 separated by a bridge portion 12. An intermediate hull portion 13 is positioned between the lateral hull portions and beneath the bridge portion 12.

Figure 1:
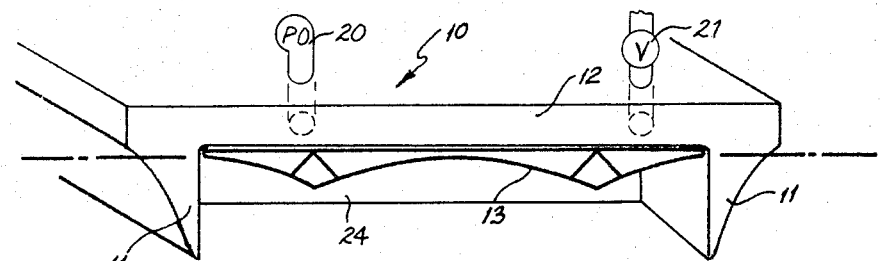
FIG. 1 is a perspective, schematic cross-sectional view through a vessel according to the present invention with the intermediate hull portion in a raised position.
Figure 2:
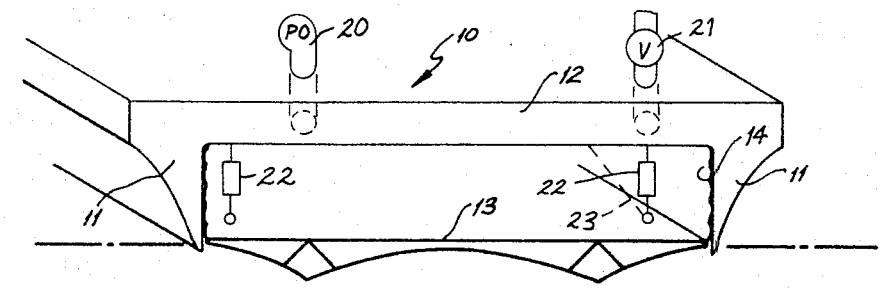
FIG. 2 is a similar view of the boat hull of FIG. 1 in which the plenum chamber is expanded and the intermediate hull portion is in a lowered position.

A flexible plenum chamber 14 is provided between the intermediate hull portion 13 and the bridge portion 12. Pump means shown schematically at 20 are provided to pump air into the plenum chamber 14 and valve means (not shown) are provided to release air from the chamber 14. By controlling the pump and the valve it is possible to raise and lower the intermediate hull portion 13 relative to the lateral hull portions 11. As is seen in FIG. 2 if the plenum chamber 14 is expanded and the intermediate hull portion lowered the vessel assumes the shape and configuration of a conventional vessel and may be powered in some conventional way to act as a conventional displacement hull.

Figure 3:
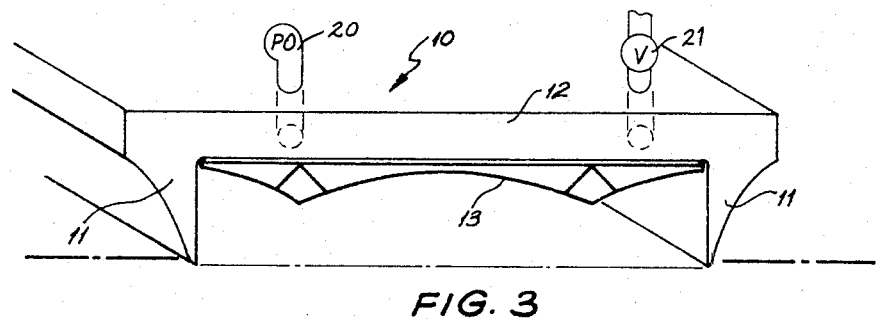
FIG. 3 is a similar view of the boat hull of FIG. 1 in which the intermediate hull portion is retracted but air is pumped beneath the intermediate hull portion to raise the boat hull onto a cushion of air.
Figure 4:
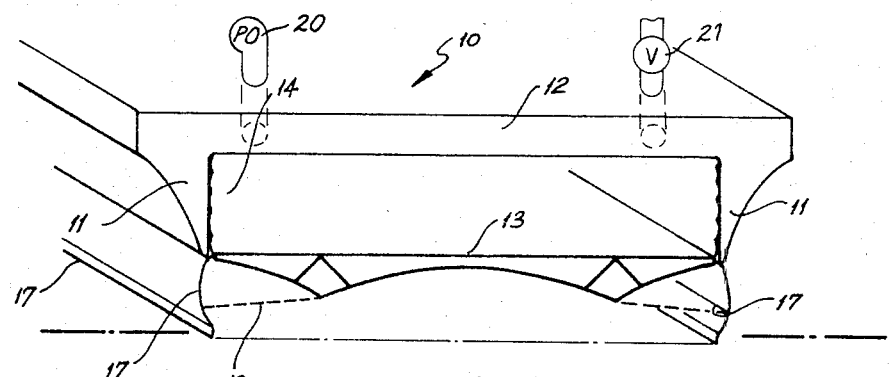
FIG. 4 is a similar view of the boat hull of FIG. 1 in which the plenum chamber is expanded and the intermediate hull portion is lowered and the full skirt on the intermediate hull portion is extended and air is pumped beneath the intermediate hull portion to raise the vessel on a cushion of air.
Figure 5:
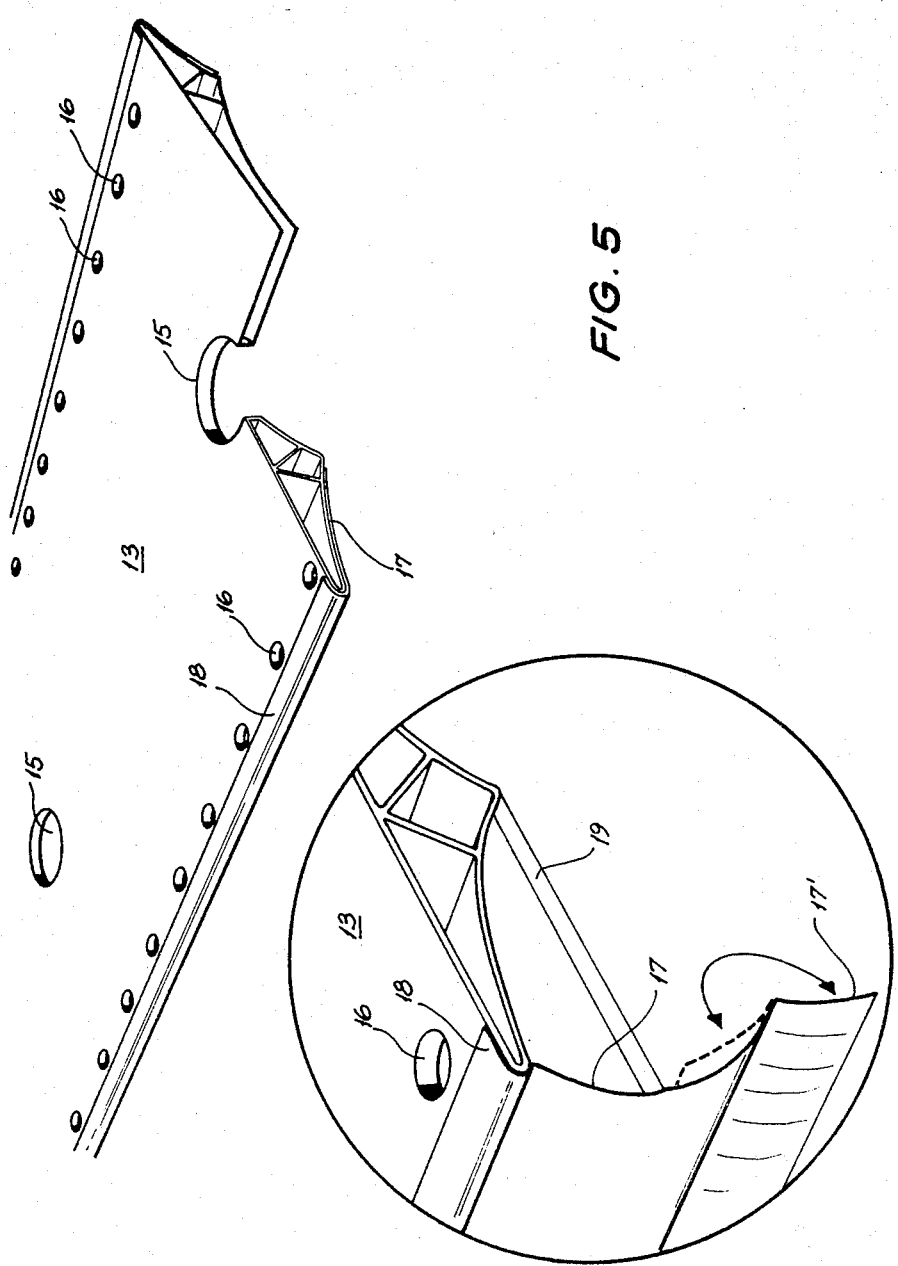
FIG. 5 is a partly cut away perspective view and an enlarged part thereof of the intermediate hull portion of the boat hull of FIG. 1.

As is seen in FIG. 5 the intermediate hull portion 13 is provided with apertures 15 which are provided with valve means (not shown) and which communicate with the interior of the plenum chamber 14 and the underside of the intermediate hull portion 13. If the valve means on the apertures 15 are opened air pumped into the plenum chamber 14 by the pump will pass through the plenum chamber 14 and cause a cushion of air to be formed beneath the hull as is shown in FIG. 3 (bow and stern skirts not shown). In this configuration the vessel may be used as a solid side wall air cushion vessel and in this arrangement the vessel is in its most suitable configuration for open water travel. Control of the valve aperture will allow the size of the plenum chamber to be varied even while the vessel is being used in its hovercraft mode. Air entrainment means is provided extending between the lateral extremities of the hull near the aft end of the intermediate hull as shown schematically at 24.

The intermediate hull portion 13 is also provided with apertures 16 which are provided with valve means (not shown). The apertures 16 provide a communication between the plenum chamber 14 and the interior of skirts 17 formed along the lateral marginal portions of the intermediate hull portion 13. If the valve controlling the apertures 16 are opened, air in the plenum chamber 14 will flow into the skirt portions thereby extending the skirt portions 17. The skirt 17 is connected to the intermediate hull portion along its upper edge 18. Attached to the lowermost edge of skirt portions 17 is a further more flexible skirt 17' which extends beneath skirt 17 to provide better seal between the skirt and the ground or water surface. A plurality of webs 19 are spaced apart along the length of the skirt 17 and are disposed at right angles thereto. The web 19 is formed of an elastic material which draws the skirt flat against the underside of the intermediate hull portion 13 when the skirt 17 is not extended. When these skirt portions are extended and the intermediate hull portion is lowered the intermediate hull portion and the skirt portions together will define a chamber beneath the intermediate hull portion into which air may be passed from the plenum chamber 14. In this configuration the vessel will act as a fully skirted hovercraft type vessel. In this instance means are provided to hold the intermediate hull portion 13 in a lowered position when the valves controlling the aperture 15 are opened to allow air to flow beneath the intermediate hull portion.

It will be appreciated that in an alternative embodiment of the invention means, such as a parallel motion linkage, schematically shown at 22 and 23, may be provided to allow simultaneous vertical and horizontal movement of the intermediate hull portion. The use of an appropriate parallel motion linkage having hydraulic or pneumatic rams incorporated into each leg of the parallel motion linkage would allow the vessel to "walk" on land by the expedient of lowering the intermediate hull portion below the level of the lateral hull portions, moving the intermediate hull portion relatively backwardly thereby advancing the lateral hull portions in an absolute sense, raising the intermediate hull portion so that it is clear of the ground, moving it forward and sequentially repeating the above cycle.

The present invention also envisages a "mono" hull vessel having a tunnel or intermediate portion set back from the bow of the hull which comprises a resilient underside to enable the hull to operate as a conventional planing hull and which can display skirts to enable operation as an air cushion vehicle so as to cross small areas while travelling at speed.

If necessary, air cushion skirts may be provided across the bow and stem of the intermediate portion and not directly secured to the hull but forming part of the intermediate portion so as to reduce loss of air cushion support.

Appropriately a hull in accordance with this invention has an upwardly sloping bow and the intermediate hull portion has a recess which slopes upwardly toward the bow. A sloping intermediate portion with a bow skirt enables the skirt to lay back substantially horizontally when retracted so as to be out of contact with the water when not in use and also out of contact with the ground when in a hull "walking" mode. This inclination permits the bow skirt to reach the water or ground surface as it is deployed pivotally forward from its retracted position. In this way the bow skirt can fold and extend with the intermediate hull portion retracted so that the bottom edge of the bow skirt extends at least level with the underside of the lateral hull portions.

It will be recognized by persons skilled in the art that numerous variations and modifications may be made to the invention as described above without departing from the spirit or scope of the invention as broadly described.

I claim:

1. A boat hull comprising at least one longitudinally extending hull having lateral extremities, an intermediate hull portion between the lateral extremities of said at least one hull, air entrainment means extending between the lateral extremities of the hull adjacent the rear end of the intermediate hull portion, means to raise and lower the intermediate hull portion relative to the remainder of the hull between a lowered position wherein the intermediate hull portion is in contact with the water in which the boat hull floats and a raised position wherein a chamber is defined, when air is introduced under pressure beneath said intermediate hull portion, between said intermediate hull portion, the water, said lateral extremities of the hull and said air entrainment means, and means to introduce air beneath the intermediate hull portion when it is in the raised position so that the hull may then be supported on a cushion of air.

2. The boat hull as claimed in claim 2 and further comprising: flexible skirt means formed integrally with the intermediate hull portion which may be utilized when the intermediate hull portion is in lowered position to entrain air beneath the intermediate hull portion with the lateral extremities of the hull clear of the ground or water over which the vessel is positioned.

3. A boat hull as claimed in claim 1 wherein said means to raise and lower the intermediate hull portion relative to the remainder of the hull also comprises means to move the intermediate hull portion fore and aft relative to the remainder of the hull.

4. A boat hull as claimed in any one of the preceding claims wherein said means to raise and lower said intermediate hull portion comprises plenum chamber means.

5. A boat hull as claimed in claim 4 wherein said plenum chamber means is flexible and expandable by pumping air thereinto so as to lower the intermediate hull portion.

6. A boat hull as claimed in claim 4 and further comprising means to exhaust air admitted to the plenum chamber beneath the intermediate hull portion to provide said air cushion beneath the hull.

7. A boat hull as claimed in claim 1 wherein said means to introduce air under pressure beneath the intermediate hull portion comprises adjustable nozzles which are adjustable to provide both lift and propulsion to the hull.

8. A boat hull as claimed in claim 1 and further comprising extendable flexible skirts along opposite sides of the intermediate hull portion.

9. A boat hull as claimed in claim 1 wherein said intermediate hull portion further comprises flexible bow and stern skirts extendable beneath the intermediate hull portion.

10. A boat hull as claimed in claim 8 or 9 and further comprising retracting means for retracting said skirts against the underside of the intermediate hull portion when they are not extended.

11. A boat hull as claimed in claim 6 wherein said means to introduce air under pressure beneath the intermediate hull portion comprises adjustable nozzles which are adjustable to provide both lift and propulsion to the hull.

* * * * *